United States Patent [19]

Iwamura et al.

[11] Patent Number: 4,991,117
[45] Date of Patent: Feb. 5, 1991

[54] FIGURE DATA DISPLAY METHOD AND SYSTEM

[75] Inventors: Kazuaki Iwamura, Hachiouji; Shigeru Kakumoto, Kodaira, both of Japan; Rita M. Harder, Bellport, N.Y.; Yasunori Emura, Hirakata, Japan

[73] Assignees: Hitachi, Ltd.; Hitachi Seiko, Ltd., both of Tokyo, Japan

[21] Appl. No.: 283,915

[22] Filed: Dec. 13, 1988

[30] Foreign Application Priority Data

Dec. 16, 1987 [JP] Japan .............................. 62-316260

[51] Int. Cl.⁵ ............................................ G06F 15/06
[52] U.S. Cl. .................................... 364/521; 364/518; 340/750; 340/799
[58] Field of Search ........ 364/518, 521, 200 MS File, 364/900 MS File, 424.1, 522, 449; 340/747, 750, 990, 798, 799

[56] References Cited

U.S. PATENT DOCUMENTS

| | | | |
|---|---|---|---|
| 4,571,684 | 2/1986 | Takanabe et al. | 364/449 |
| 4,578,766 | 3/1986 | Caddy | 364/521 |
| 4,661,810 | 4/1987 | Himelstein et al. | 340/709 |
| 4,689,616 | 8/1987 | Goude et al. | 340/725 |

*Primary Examiner*—Gary V. Harkcom
*Assistant Examiner*—Phu K. Nguyen
*Attorney, Agent, or Firm*—Antonelli, Terry, Stout & Kraus

[57] ABSTRACT

A figure data display method and system in which the contents to be stored and constituting data are stored in the form of figure data divided into a plurality of partial areas, a file information table is prepared which registers therein figure area information, along with volume information of the figure data, in the sequence of serial numbers allocated to the partial areas dependent on their positions, and those partial areas, which are necessary for display of the figure data, are searched within a range of the registered serial numbers. By preparing the figure data represented in the compressed form by taking relative values between the coordinate values of respective features points in the figure data, or by retrieving file names in a manner involving direct searching the figure data from a storage medium, operation from the step of reading the figure data to the step of displaying the same can be speeded up. High-speed infinite scrolling can also be achieved by setting an adjacent area based on the above retrieval when the predetermined area to be displayed is exceeded upon scrolling of the display area, and then deleting the unnecessary area.

22 Claims, 8 Drawing Sheets

FIG. 2

| AREA NUMBER | SPACE NUMBER | | | |
|---|---|---|---|---|
| | (0, M-1)<br>MN-N | (1, M-1)<br>MN-N+1 | | (N-1, M-1)<br>MN-1 |
| | | | | |
| | (0, 1)<br>N | (1, 1)<br>N+1 | | (N-1, 1)<br>2N-1 |
| | (0, 0)<br>0 | (1, 0)<br>1 | | (N-1, 0)<br>N-1 |
| | DIVIDED AREA | | FIGURE SPACE | |

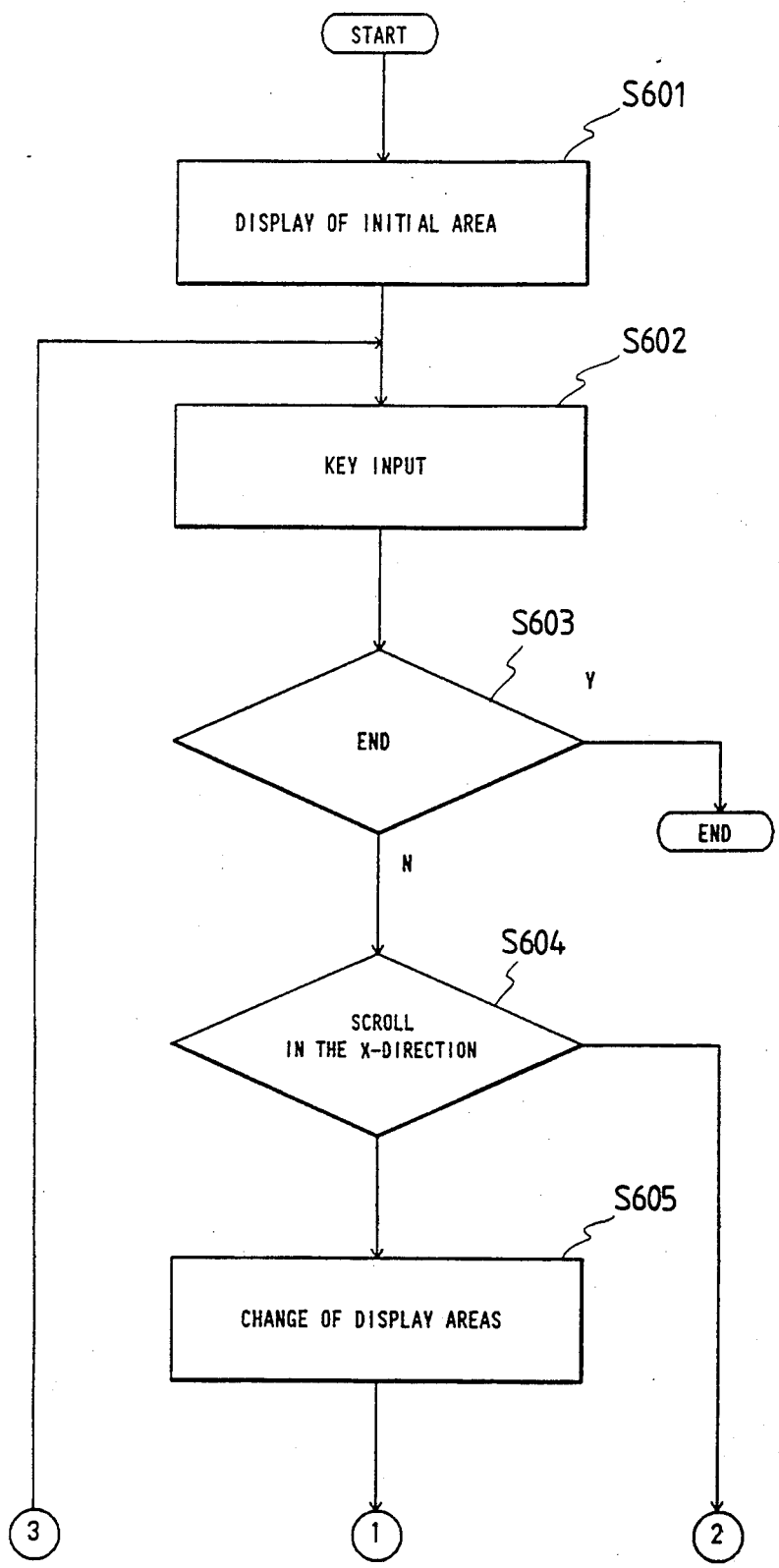

… (1)

FIGURE DATA DISPLAY METHOD AND SYSTEM

BACKGROUND OF THE INVENTION

1. Field of the Invention

The present invention relates to a method of displaying figure data at a high speed, and more particularly to a figure data display method and system suitable for the case which requires a short overall time to search and display figure data.

2. Description of the Prior Art

To date, as seen in Japanese Patent Laid-Open No. 62-25789 (1987), figure drawing speed has been improved principally by increasing a signal processing speed in display units.

The prior art has had the following problems:

(1) Speed of effective figure display including data retrieval from data storage equipment has not been taken into account.

(2) Scrolling requires searching and displaying the data not yet displayed during its process, but this process takes time, making it difficult to realize continuous operation of the scrolling itself.

(3) As an example, U.S. Pat. No. 4,322,658 and No. 4,307,772 have proposed a method of scrolling, at a high speed, the data transmitted to a memory of the display. But, attempts have not been made to transmit data by setting a new area when a predetermined area for the data to be displayed is exceeded, or to delete the unnecessary area for the capability of infinite scrolling.

SUMMARY OF THE INVENTION

It is an object of the present invention to solve the above problems, and provide a data display method and system which can speed up effective figure display, and which can achieve continuous scrolling or the like.

According to the present invention, therefore, the contents to be stored and constituting data are stored in the form of figure data divided into a plurality of partial areas, a file information table is prepared which registers therein figure area information, along with volume information of the figure data, in the sequence of serial numbers allocated to the partial areas dependent on their positions, and those partial areas, which are necessary for display of the figure data, are searched within a range of the registered serial numbers. As required, by preparing the figure data represented in the compressed form by taking relative values between the coordinate values of respective featured points in the figure data, or by making retrieval of file names in a manner of directly searching the figure data from a storage medium, operation from the step of reading the figure data to the step of displaying the same can be speeded up. High-speed infinite scrolling can also be achieved by setting an adjacent area based on the above retrieval when the predetermined area to be displayed is exceeded upon scrolling of the display area, and then deleting the unnecessary area. This enables speeding up of the process from name input of the figure data to display of the figure data corresponding to the input name.

The foregoing and other objects, advantages, manner of operation and novel features of the present invention will be understood from the following detailed description when read in connection with the accompanying drawings.

BRIEF DESCRIPTION OF THE DRAWINGS

FIG. 2 is a view showing division of a figure area;

FIGS. 6(a)-6(c) are flowcharts showing the scrolling algorithm.

DETAILED DESCRIPTION OF THE PREFERRED EMBODIMENTS

Figure 1:
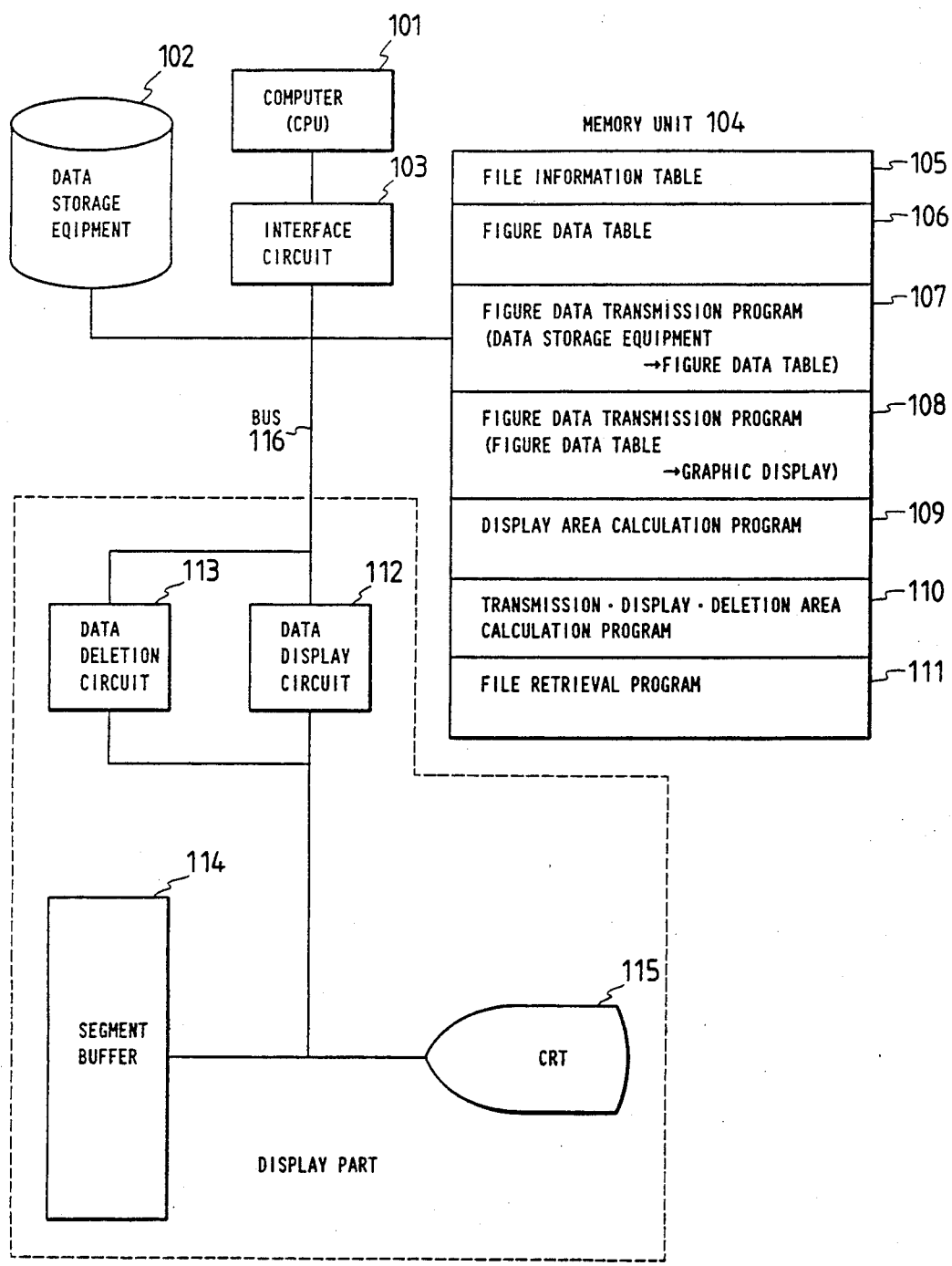
FIG. 1 is a system configuration view for a high-speed figure data display.

The system configuration embodying a figure data display method of the present invention is shown in FIG. 1. In this system, transmission of figure data and operation of a display part are both controlled by a computer (CPU) 101 through an interface circuit 103. Figure data to be displayed is stored in a data storage equipment 102 such as a hard disk, for example.

On a memory unit 104, there are prepared a file information table 105 as an area in which file information is to be registered, and a figure data table 106 as an area which stores therein figure data taken out of the data storage equipment 102. Additionally prepared are programs such as a figure data transmission program 107 for transmitting the figure data from the data storage equipment 102 to the figure data table 106, another figure data transmission program 108 for transmitting the figure data from stored in the figure data table 107 to the display part, a display area calculation program 109, a transmission display/deletion area calculation program 110, and a file retrieval program 111 for searching the file information table.

The display part comprises a data display circuit 112, a data deletion circuit 113, a segment buffer 114, and a CRT display 115. The data transmitted via a bus 116 is interpreted through the data display circuit 112, and then converted to beam information for display on the CRT 115. Simultaneously, the data for a group of figures each corresponding to one area is labeled with a unique label and registered in a segment buffer 114. The data deletion circuit 113 serves, when the display data is changed, to delete the figure data found unnecessary from the display and the segment buffer while referring to the labels of the display data.

The figure data is given by dividing a figure space with equal intervals in both the X and Y directions, as shown in FIG. 2. The numbers of divided areas are assumed to be N, M in the X-axis and Y-axis directions, respectively. Each of the divided areas is numbered by (I, J). Hereinafter, (I, J) will, be referred to as the space number, and I, J as an X element and a Y element, respectively. It is here assumed that (0, 0) represents the divided area of left bottom point and (N-1, M-1) represents that of right top point. Also, the divided areas are each added with the serial number NUM calculated by:

$$NUM = J \times N + I \quad \ldots (1)$$

Figure 3:
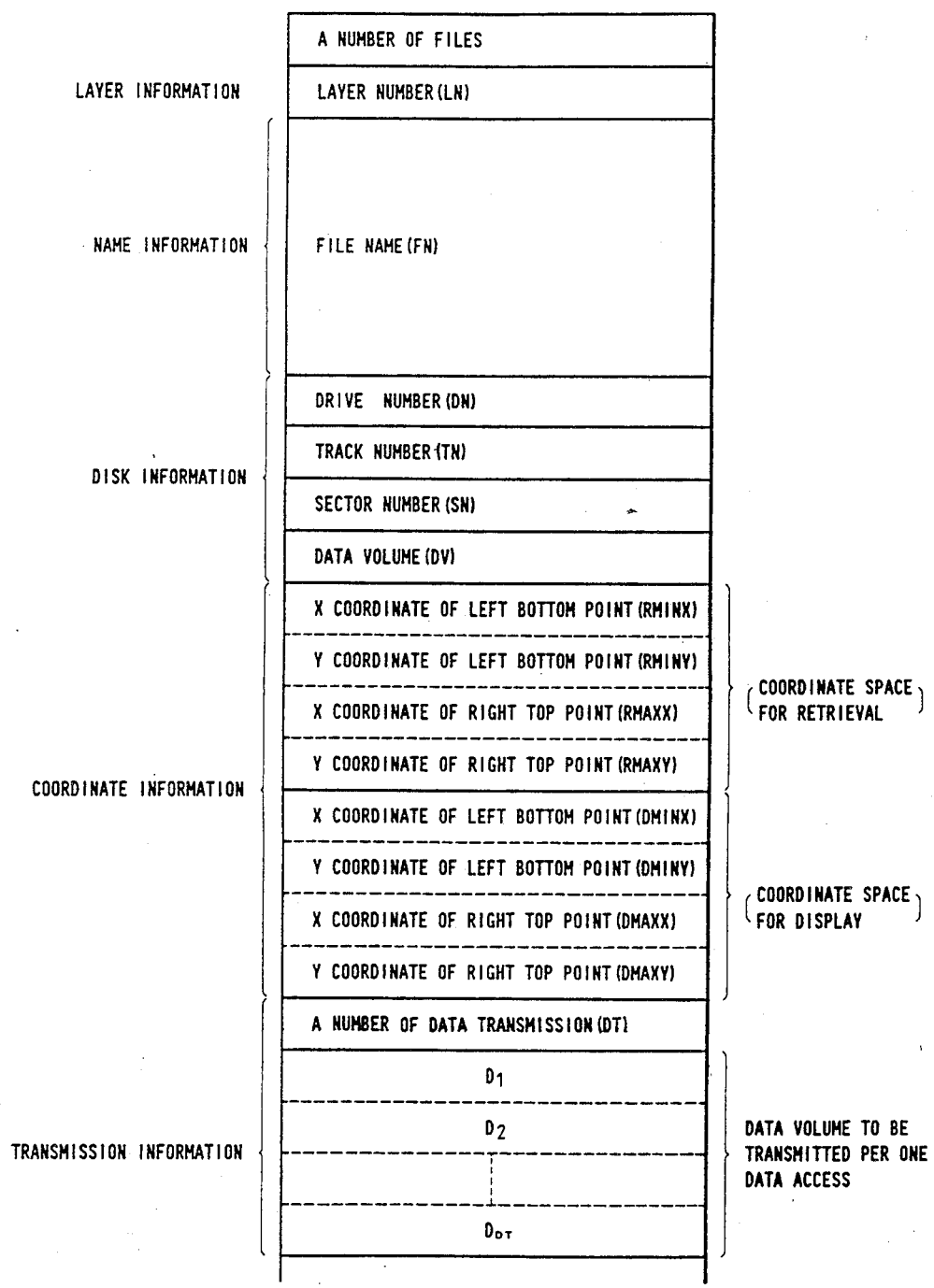
FIG. 3 is a view showing an exemplified specification of a file information table.

Hereinafter, NUM will be referred to as the area number. Information of the divided areas is registered into the file information table in accordance with the sequence of the area numbers. An example of specification of the file information table is shown in FIG. 3. Information relating to the figure includes name information, disk information, coordinate information, transmission information, and layer information. Registered as the name information is the name corresponding to the figure. Registered as the disk information are the drive number (DN) indicating which disk driver is to be driven, the track number (TN) indicating the track of the disk where the data is registered, the sector number (SN), and the data volume (DV) indicating how much data is to be taken out of the sector. Registered as the coordinate information are the coordinates used when searching the data (i.e., coordinate space for retrieval (DS)), and the coordinates used for determining where and how large the figure is to be displayed on the display (i.e., coordinate space for display (DS)). Further, registered as the transmission information are the data volume to be transmitted per one data access and the number of data transmissions (DT), in consideration of the fact that because the data volume to be transmitted to the display for each time is restricted due to limitation on hardware of the display, the figure data must be sometimes transmitted separately several times, and in consideration of the fact that because the data is registered and read in units of one block which contains the designated data volume (dependent on systems), the needless data may be registered in the last block. By registering the layer numbers (LN) of the layered information into this table, the figure can be searched in a hierarchical manner. In the case of maps, for example, retrieval can be made in the order of Japanese map→ prefecture map→city map→town map→town→ block map.

Figure 4A:
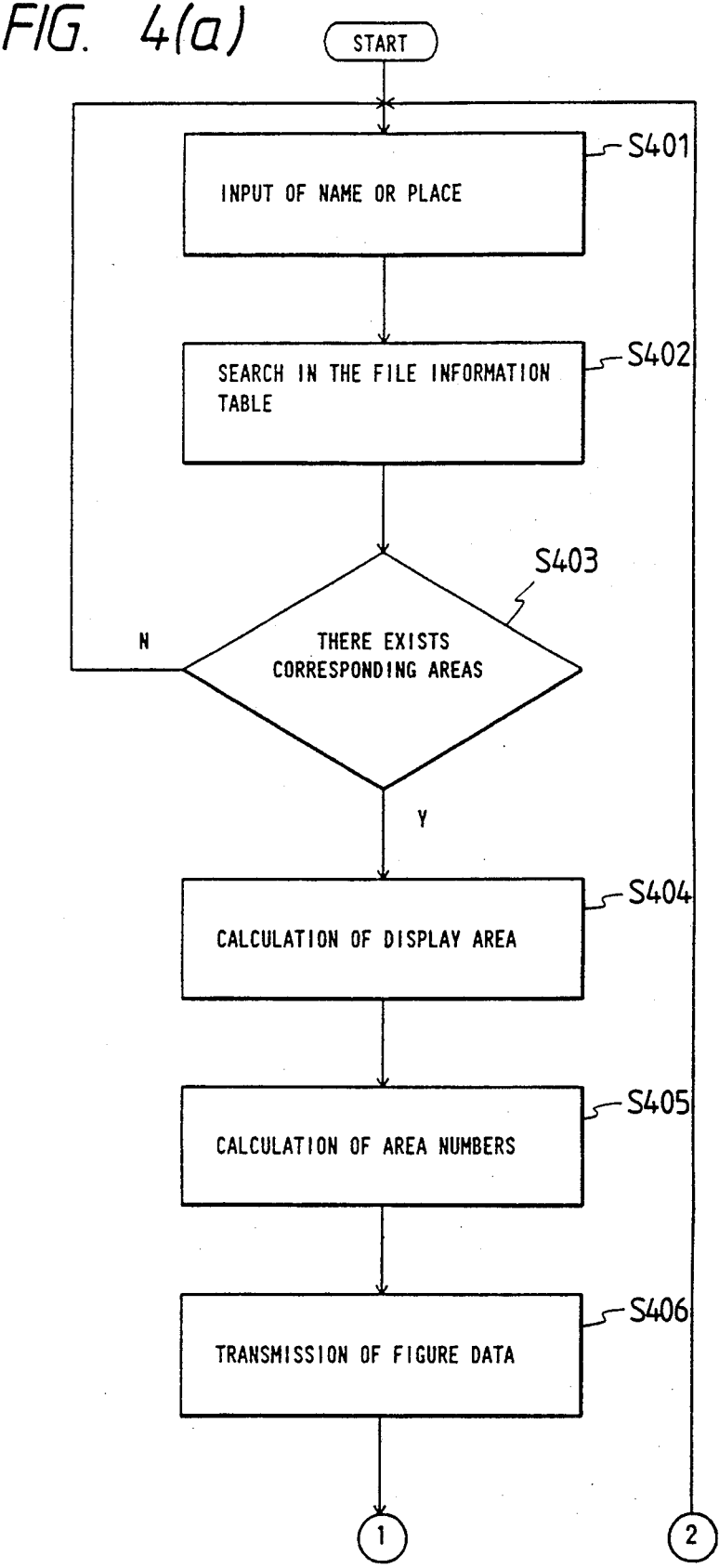
FIGS. 4(a) and 4(b) are flowcharts showing the figure data display algorithm.
Figure 4B:
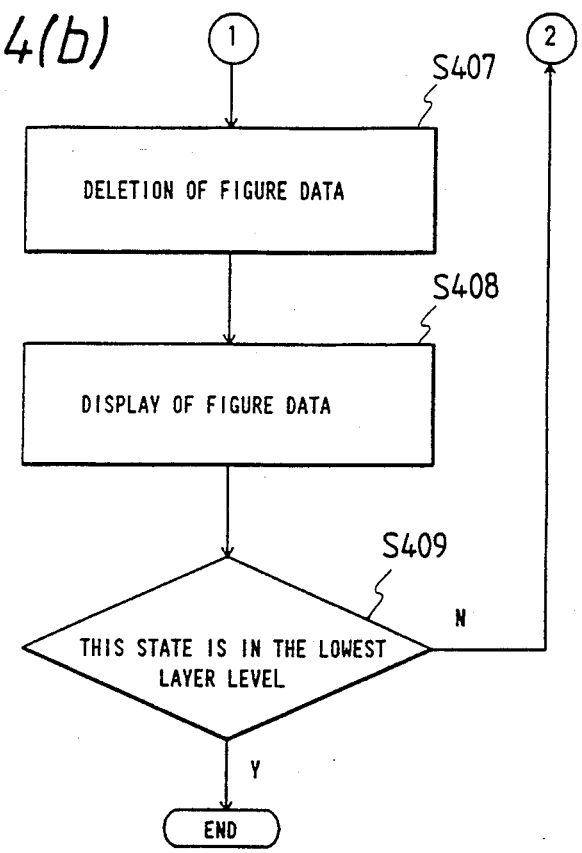

The algorithm for displaying the figure data is shown in FIG. 4. To begin with, the name of the figure data, or the place in case of a map, to be displayed is input (step S401). The input coordinates or name is compared with the information registered in the file information table.

Subsequent to the step S401, the file information table is searched for comparing the input name or coordinates with the name or the coordinate space for retrieval registered in the table (step S402). If, there exists the corresponding figure area (step S403), the size of the figure areas to be displayed about that,, corresponding figure area is calculated (step S404). The display area can be a rectangular area which has an X-direction length of LX and a Y-direction length of LY. Assuming for the rectangular area that the coordinates of the left bottom point are (XMIN, YMIN) and the coordinates of the right top point are (XMAX, YMAX), the respective coordinates are calculated as follows:

$$XMIN = (RMAXX + RMINX - LX)/2 \quad (2)$$
$$YMIN = (RMAXY + RMINY - LY)/2$$
$$XMAX = (RMAXX + RMINX + LX)/2$$
$$YMAX = (RMAXY + RMINY + LY)/2$$

Here, (RMINX, RMINY), (RAMAXXD, RMAXY) are coordinates of the right bottom and left upper points of the divided areas, respectively, which are registered, as the coordinate space for retrieval, in the file information table. Based on these coordinate values, the minimum value Xn and the maximum value Xn' of X-element of the space number, as well as the minimum value Yn and the maximum value Yn' of Y-element thereof are calculated as follows:

$$Xn = [XMIN/XLENG] \quad (3)$$
$$Xn' = [XMAX/XLENG]$$
$$Ym = [YMIN/YLENG]$$
$$Ym' = [YMAX/XLENG]$$

Here, [x] is a Gauss symbol which means calculation to determine the maximum integer not exceeding x. XLENG, YLENG indicate the X-direction and Y-direction lengths of the divided figure areas, respectively. By substituting the equation (3) for N, J in the equation (1), the area numbers are calculated (step S405). With J fixed, the area numbers are given as follows:

$$Ym \quad XN+I \quad (I=Xn, \ldots Xn')$$

$$Ym' \quad XN+I \quad (I=Xn, \ldots Xn')$$

By referring to the disk information based on the file information corresponding to the above area numbers, the figure data are read out of the data storage equipment and transmitted to the figure data table (step S406). If the individual figure data are stored in a successive manner, all those data can be read by one access. Then, the figure data remaining in the segment buffer is deleted (step S407). The figure data in the figure data table is now transmitted to the display and displayed thereon while being registered into the segment buffer (step S408). The reason for registering the figure data into the segment buffer is to prevent the figure from being deleted at the time the display is refreshed. Not that the figure data may also be displayed without storing the same into the segment buffer. In this case, display on the system is further speeded up. Where the figure currently displayed has lower layers, the process from the step S401 to the step S408 will be repeated (step S409).

The figure data can be displayed at a higher speed when prepared in the compressed form suitable for display. For example, it is possible to represent all the coordinates with relative values except the coordinates of the figure's origin. With X, Y coordinates each represented with 2 bytes, if each of the relative values is within, 1 byte, one point can be represented with 3 bytes in addition to the code of 1 byte indicating the compression technique, thus resulting in the data compressed. This enables the reduction of the data volume to be transmitted and hence shortens the display time inclusive of the transmission time.

By utilizing the figure data display method explained above, the figure data can be scrolled smoothly. Scrolling is performed as follows. Movement of the area effected by scrolling is implemented by means of a scroll direction indicator unit such as a keyboard, wheel, mouse, or tablet.

Figure 5:
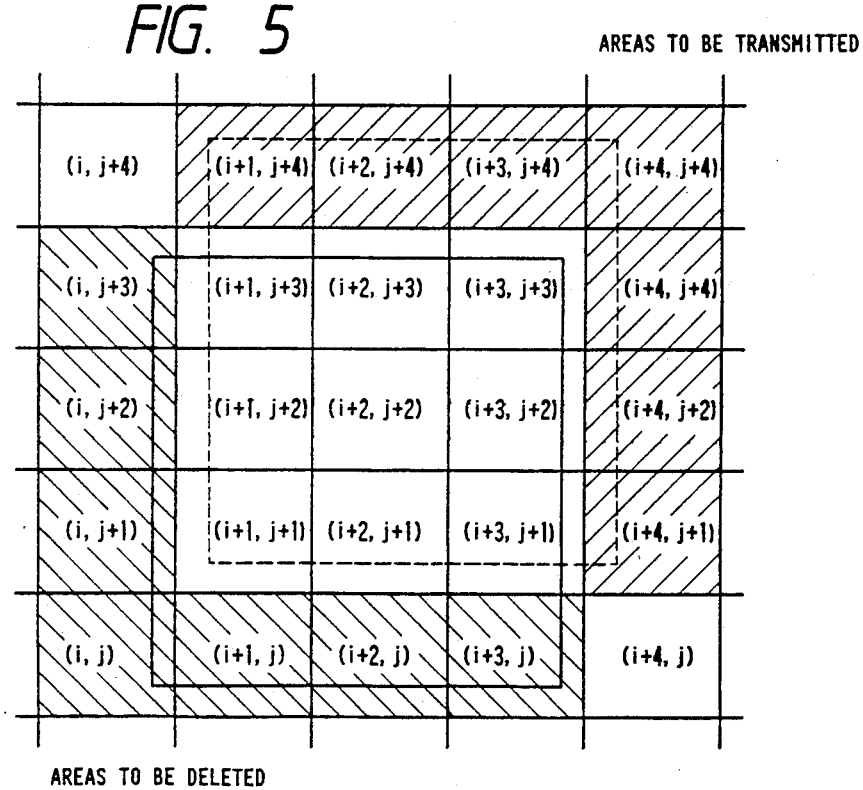
FIG. 5 is a view showing an example of scrolling.

FIG. 5 shows the areas from which the data are to be transmitted and the areas in which the data are to be deleted while scrolling. It is assumed that the display area corresponds to 12 patches of the divided areas. Before movement, the display area is included within the following 12 divided areas:

$$(I, J) (I=i, \ldots i+3, J=J, \ldots j+3)$$

Therefore, the figure display data corresponding to those 12 divided areas are transmitted and displayed.

Assume now that the display area is moved upward and rightward to one illustrated by dotted lines in FIG.

5. In this case, the figure data with the following space numbers are transmitted:

$$(I, J) \quad (I=i+1, \ldots, i+4, J=j+4;$$
$$I=i+4, J=j+1, \ldots, j+3)$$

Since the areas having the space numbers of;

$$(I, J) \quad (I=i, J=j, \ldots, j+3;$$
$$I=i+1, \ldots, i+3, J=j)$$

leave the display area, the figure data deletion circuit is operated to delete the figure data corresponding to those offset areas from the display and the segment buffer.

Figure 6B:
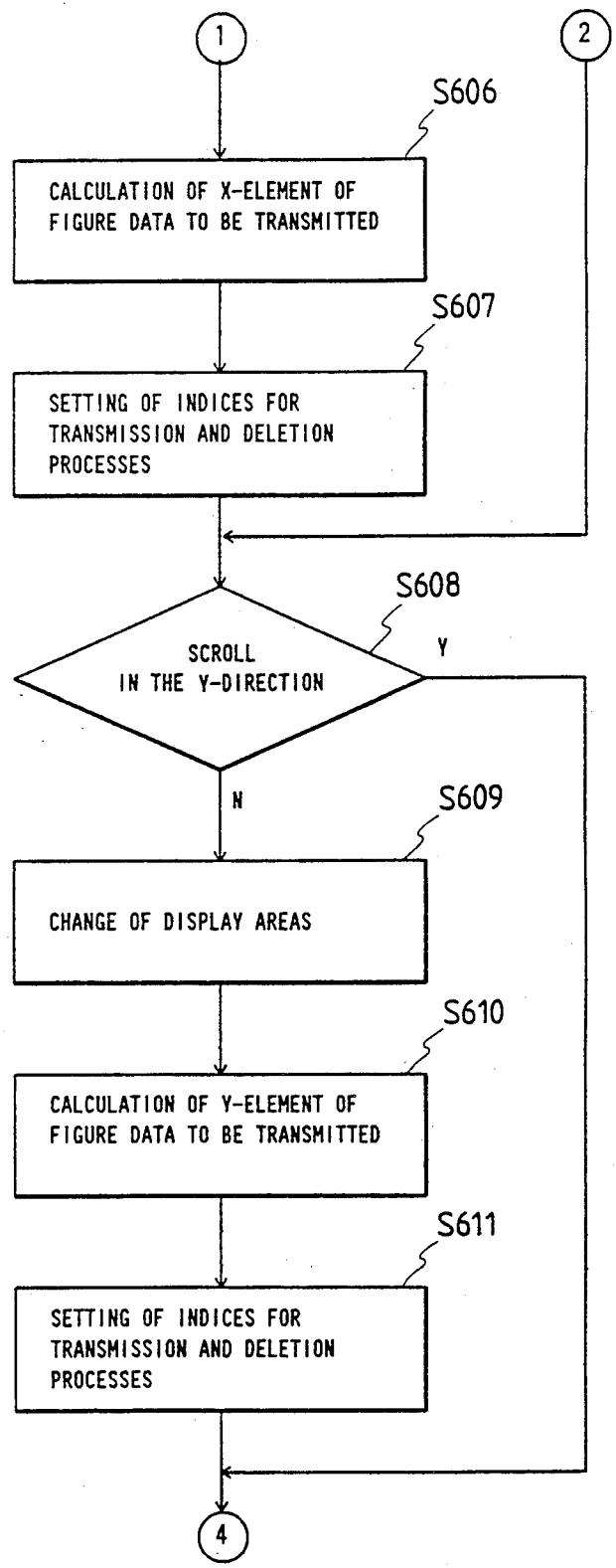
Figure 6C:
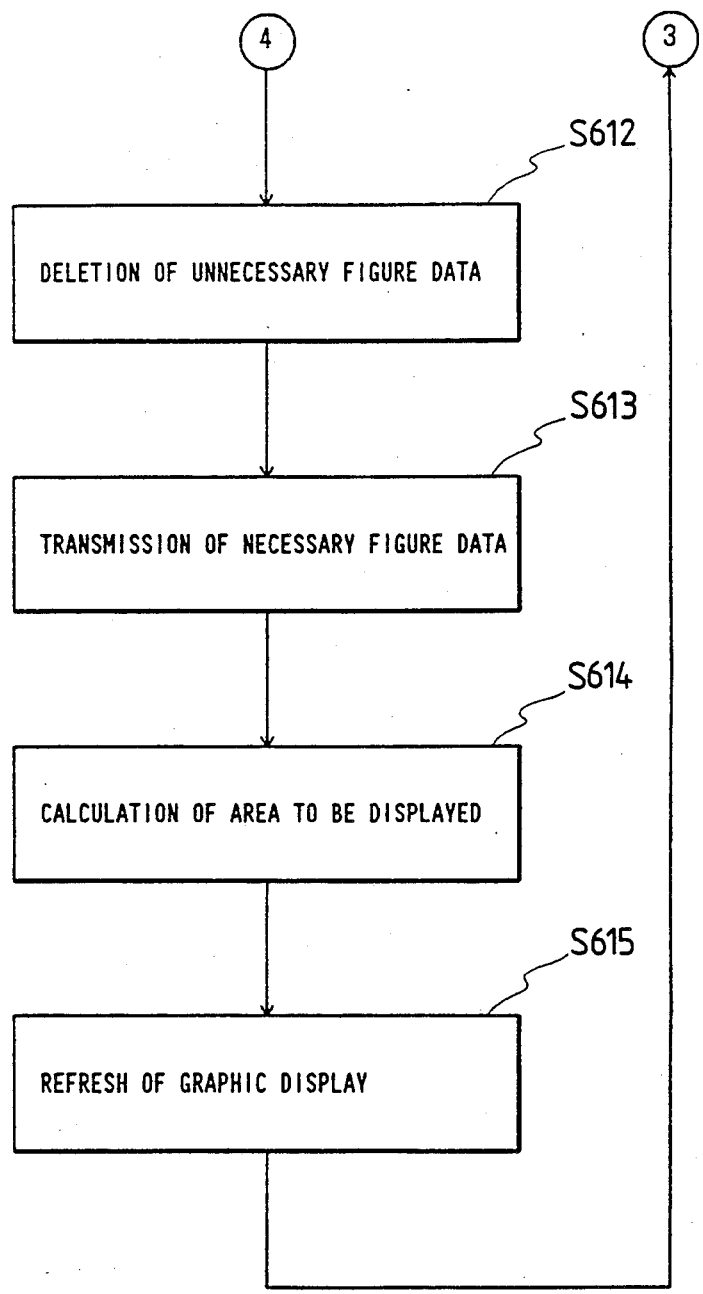

The algorithm for scrolling is shown in FIG. 6. As the initial display area, the figure data having the space numbers of;

$$(I, J) \quad (I=Xn, Xn+1, \ldots, Xn',$$
$$J=Ym, Ym+1, \ldots, Ym',$$
$$Xn' > Xn, Ym' > Ym)$$

are transmitted and displayed (step S601). Each of the area number (NUM) of the figure data to be transmitted at this time is given by:

$$NUM = Y \times N + X \quad (4)$$
$$(X = Xn, Xn+1, \ldots, Xn')$$
$$(Y = Ym, Ym+1, \ldots, Ym')$$

Then, key input is applied to determine the next operation (step S602). Here, if an end key (e.g., carriage return) is touched, scrolling is terminated (step S603). If an X-direction scroll key is touched (step S605), the display area in the X-direction is changed (step S605).

$$X M I N \leftarrow X M I N + X D I V$$
$$X M A X \leftarrow X M A X + X D I V \quad (5)$$

XDIV is a shift amount (scroll pitch) in the X-direction. XDIV>0 means the movement toward the positive side and XDIV<0 means that toward the negative side. XMIN, XMAX represent the X coordinates of the left bottom (or left top) point and the right bottom (or right top) point of the display area, respectively.

The change of X-element range upon the movement in the X-direction is calculated by;
$$X n = [X M I N / X L E N G]$$

$$X n' = [X M A X / X L E N G] \quad \ldots (6)$$

i.e., given by a shift from Xn to Xn' (step S606). Prior to execution of the equations (6), let Xn, Xn' to be replaced with Xnb, Xnb', respectively.

Next, indices (Nxmin, Nxmid, Nxmax, DNxmin, DNxmid DNxmax), which are used in the processes for determining the area numbers of the figure data to be transmitted and deleted, are set (step S607). If Xn>Xnb or Xn'<Xnb, the following equations are set:

$$\begin{aligned}&Nxmin=Xn\\&Nxmid=Xn'\\&Nxmax=Xn'\\&DNxmin=Xnb\\&DNxmid=Xnb'\end{aligned} \quad (7)$$

$$DNxmax=Xnb'$$

If $Xn \geq Xnb$ and $Xn \leq Xnb'$, the following equations are set:

$$\begin{aligned}&Nxmin=Xn\\&Nxmid=Xnb'\\&Nxmax=Xn'\\&DNxmin=Xnb\\&DNxmid=Xn\\&DNxmax=Xnb'\end{aligned} \quad (8)$$

If $Xn' \geq Xnb$ and $Xn' \leq Xnb'$, the following equations are set:

$$\begin{aligned}&Nxmin=Xn\\&Nxmid=Xnb\\&Nxmax=Xn'\\&DNxmin=Xnb\\&DNxmid=Xn'\\&DNxmax=Xnb'\end{aligned} \quad (9)$$

Upon depressing of any numeral key, if it is a Y-direction scroll key (step S608), the display area in the Y-direction is changed (step S609).

$$Y M I N \leftarrow Y M I N + Y D I V$$

$$Y M A X \leftarrow Y M A X + Y D I V \quad (10)$$

YDIV is a shift amount (scroll pitch) in the Y-direction. YDIV>0 means the movement toward the positive side and YDIV<0 means that toward the negative side. YMIN, YMAX represent the Y coordinates of the left bottom (or left top) point and the right bottom (or right top) point of the display area, respectively.

The change of Y-element range upon the movement in the Y-direction is calculated by;
$$Y m = [Y M I N / Y L E N G]$$

$$Y m' = [Y M A X / Y L E N G] \quad (11)$$

i.e., given by a shift from Ym to Ym' (step S610). Prior to execution of the equations (11), let Ym, Ym' to be replaced with Ymb, Ymb', respectively.

Next, indices (Nymin, Nymid, Nymax, DNymin, DNymid, DNymax), which are used in the processes for determining the area numbers of the figure data to be transmitted and deleted, are set (step S611). If Ym->Ymb' or Ym'<Ymb, the following equations are set:

$$\begin{aligned}&Nymin=Ym\\&Nymid=Ym'\\&Nymax=Ym'\\&DNymin=Ymb\\&DNymid=Ymb'\\&DNymax=Ymb'\end{aligned} \quad (12)$$

If $Ym \geq Ymb$ and $Ym \leq Ymb'$, the following equations are set:

$$\begin{aligned}&Nymin=Ym\\&Nymid=Ymb'\\&Nymax=Ym'\\&DNymin=Ymb\\&DNymid=Ym\\&DNymax=Ymb'\end{aligned} \quad (13)$$

If $Ym' \geq Ymb$ and $Ym' \leq Ymb'$, the following equations are set:

$$Nymin = Ym \quad (14)$$
$$Nymid = Ymb$$
$$Nymay = Ym'$$
$$Nymin = Ymb$$
$$Nymid = Ym'$$
$$Nymax = Ymb'$$

Where the segment buffer of the graphic display has small capacity, it is required to delete the unnecessary figure data for avoiding overflow, in order that the figure data to be newly transmitted are stored in the segment buffer. The deletion operation is controlled using four flags (DXFLG1, DXFLG2, DYFLG1, DYFLG2). As to DXFLG1, with the X-element I of the space number (I, J) r ranging from DNymin to DNymid−1, if these values are contained in the X-elements after movement, DXFLG1=1 is set, and if not, DXFLG1=0 is set. Similarly, the value of DXFLG2 is set dependent on the X-elements ranging from DNymid to DNymax, the value of DYFLG1 is set dependent on the Y-elements ranging from DNymin to DNymid−1, and the value of DYFLG2 is set dependent on the Y-elements ranging from DNymid to DNymax, respectively. Deletion of the figure data is executed using the DO sentence below (step S612).

```
if (DXFLG1 and DYFLG1) = 0 then
   do I = DNxmin to DNxmid −1;
   do J = DNymin to DNymid −1
   N U M = J × N + I
   Deletion of the figure data
   end
end
if (DXFLG1 and DYFLG2) = 0 then
   do I = DNxmin to DNxmid −1;
   do J = DNymid to DNymax
   N U M = J × N + I
   Deletion of the figure data
   end
end
if (DXFLG1 and DYFLG1) = 0 then
   do I = DNxmid to DNxmax;
   do J = DNymin to DNymid −1
   N U M = J × N + I
   Deletion of the figure data
   end
end
if (DXFLG1 and DYFLG2) = 0 then
   do I = DNxmid to DNxmax;
   do J = DNymid to DNymax
   N U M = J × N + I
   Deletion of the figure data
   end
end
```

Whether the figure data are to be deleted or not is determined by the four flags (DXFLG1, DYFLG1, DXFLG2, DYFLG2). For example, (DXFLG1 and DYFLG1)=0 means that those figure data having the space numbers of;

$$(I, J) \quad (I=DNxmin, DNxmin+1, \ldots, DNxmid-1)$$
$$(J=DNymin, DNymin+1, \ldots, DNymid-1)$$

will be deleted.
In the foregoing process, $$NUM = J \times N + I \quad (15)$$

represents the area number to be deleted.

To indicate the fact that deletion has been made, 1 bit is added to the most significant digit in the memory of the segment buffer. The segment buffer comprises two memory tables; i.e., a main buffer where the actual figure data are registered, and a subbuffer where the address and the area number are registered in pair for indicating the location of the main memory from which the figure data are registered therein. The figure data can be registered into and deleted from the segment buffer as follows.

At the beginning, the data of new areas are always successively registered behind the data which have been registered most recently. In the event of overflow of the memory, the main buffer is subjected to garbage collection. In place of garbage collection, a pointer indicating where to register the figure data may be added to the end of the preceding figure data. In case of using no pointer, it is needed to designate disconnection from the preceding and succeeding figure data. At the time of deleting the data, 0 is placed into the appropriate locations of the address table to indicate that those locations are not in use and can be overwritten.

Next, four flags XFLG1, XFLG2, YFLG1, YFLG2 YFLG1, YFLG2 are set to control transmission process of the figure data. As to DXFLG1, with the X-element I of the space number (I, J) ranging from Nxmin to Nxmid−1, if these values are contained in the X-elements before movement, XFLG1=1 is set, and if not, XFLG1=0 is set. Similarly, the value of DXFLG2 is set dependent on the X-elements ranging from Nxmid to Nxmax, the value of YFLG1 is set dependent on the Y-elements ranging from Nymin to Nymid−1, and the value of YFLG2 is set dependent on the Y-elements ranging from Nymid to Nymax, respectively.

Transmission of the figure data is executed using the DO sentence below (step S613).

```
if (XFLG1 and YFLG1) = 0 then
   do I = Nxmin to Nxmid −1;
   do J = Nymin to Nymid −1
   N U M = J × N + I
   Transmission of the figure data
   end
end
if (XFLG1 and YFLG2) = 0 then
   do I = Nxmin to Nxmid − 1;
   do J = Nymid to Nymax
   N U M = J × N + I
   Transmission of the figure data
   end
end
if (XFLG1 and YFLG1) = 0 then
   do I = Nxmid to Nxmax;
   do J = Nymin to Nymid − 1
   N U M = J × N + I
   Transmission of the figure data
   end
end
if (XFLG1 and YFLG2) = 0 then
   do I = Nxmid to Nxmax;
   do J = Nymid to Nymax
   N U M = J × N + I
   Transmission of the figure data
   end
end
```

The rectangular area after movement is divided into four parts dependent on overlap with that before movement. Whether the figure data of the divided areas in each part are to be transmitted or not is determined by the four flags (XFLG1, YFLG1, XFLG2, YFLG2).

For example, (XFLG1 and YFLG1)=0 means that those figure data having the space numbers of;

(I, J)  (I=Nxmin, Nxmin+1, ..., Nxmid−1)
        (J=Nymin, Nymin+1, ..., Nymid−1)

has not been transmitted.

In the foregoing process, $$NUM = J \times N + I \quad \ldots (16)$$

represents the area number to be transmitted and displayed. With the above technique, those data of the part in which data have not yet been input will be transmitted. When already transmitted, those data are allowed to remain unchanged.

Finally, the coordinates indicating the figure area to be displayed are sent to the graphic display (step S614). The graphic display is then refreshed to display the new area (step S615). By repeating the above process, it becomes possible to smoothly make scrolling without suffering to data in limitation on the scrolled area.

The above-mentioned figure display method is not limited to data in on the form of figure data. Accordingly, the figure data may be pixel data or run length data. Thus, the present method can be applied to the whole field of retrieval and display for the figure and image data. In addition to the display field, the present method is also effective in case of searching figure data to carry out any other processing such as figure editting.

In practice of prevention against disasters, particularly, it is required to search and display maps at a high speed. Specifically, searching and displaying at the speed of more than 10000 vectors per one second is necessary. Including the map retrieval at such urgent case, the present invention can be applied to display of various graphic data, particularly, display of design drawings used in the computer aided system (CAD).

What is claimed is:

1. A figure data display system comprising:
   first storage means for storing therein figure data to be displayed, said figure data being divided into a plurality of partial areas;
   second storage means for registering therein figure area information comprising a plurality of blocks respectively corresponding to said partial areas, each one of said blocks having a field corresponding to at least a number of data transmissions, at least a fixed length data volume field and file information related to the partial area to which said one block corresponds, and said blocks each having a serial number and being arranged in a sequence according to the serial numbers and corresponding to a sequence of numbers which are respectively allocated to the corresponding partial areas;
   searching means for searching for a number from among the serial numbers, said searching means retrieving a file information in said figure area information in order to perform said searching for said number from among the serial numbers;
   means for calculating, according to the searched number, an address in said second storage means of a block corresponding to the searched number using said field corresponding to said number of data transmissions and said fixed length data volume field of said blocks; and
   means for searching a partial area of the searched number according to said block corresponding to the searched number.

2. A figure data display system according to claim 1, wherein said retrieved file information further includes a figure name of figure data in a partial area.

3. A figure data display system according to claim 1, further comprising figure data transmitting means to transmit said partial area of the searched number from said first storage means to a display unit according to corresponding file information.

4. A figure data display system according to claim 3, further comprising means for calculating an area to be displayed and means for calculating an area to be transmitted, when transmitting said partial area of the searched number.

5. A figure data display system according to claim 4, wherein said means for calculating an area to be transmitted has means for controlling transmission and deletion of the figure data by referring to a range to be displayed, and scrolling means to sequentially calculate respective areas to be displayed and deleted.

6. A figure data display system according to claim 1, wherein figure data of at least a partial area is represented in a compressed form by taking relative coordinate values of respective featured points of the figure data, and location information of the figure data of said at least a partial area being contained in file information of a corresponding block.

7. A figure data display system according to claim 1, wherein said file information further comprises a layer number indicating a level of a hierarchial layer for efficient search and display 8. A figure data display system according to claim 1, wherein each of said partial areas is smaller than a display area of a screen.

9. A figure data display system according to claim 8, further comprising means for calculating at least a number of a particular partial area to be displayed with said partial area of the searched number, for searching the particular partial area.

10. A figure data display method comprising the steps of:
   storing figure data to be displayed, said figure data being divided into a plurality of partial areas;
   registering figure area information comprising a plurality of blocks respectively corresponding to said partial areas, each one of said blocks having a field corresponding to at least a number of data transmissions, at least a fixed length data volume field, and file information related to the partial area to which said one block corresponds, and said blocks each having a serial number and being arranged in a sequence according to the serial numbers and corresponding to a sequence of numbers which are respectively allocated to the corresponding partial areas;
   searching for a number from among the serial numbers and retrieving a file information in said figure area information in order to perform said searching for said number from among the serial numbers;
   calculating an address, according to the searched number, of a block corresponding to the searched number using said field corresponding to said number of data transmissions and said fixed length data volume field of said blocks; and searching a partial area of the searched number according to said block corresponding to the searched number.

11. A figure data display method according to claim 8, wherein said retrieved file information further includes a figure name of figure data in a partial area.

12. A figure data display method according to claim 10, further comprising the step of transmitting the partial area of said searched number to a display unit according to corresponding file information.

13. A figure data display method according to claim 12, further comprising the steps of calculating an area to be displayed and calculating and area to be transmitted, when transmitting said partial area of said searched number.

14. A figure data display method according to claim 13, wherein said step of calculating an area to be transmitted includes the steps of controlling transmission and deletion of the figure data by referring to a range to be displayed, and scrolling by sequentially calculating respective areas to be displayed and deleted.

15. A figure data display method according to claim 10, wherein figure data of at least a partial area is represented in a compressed form by taking relative coordinate values of respective featured points of the figure data, and location information of the figure data of said at least a partial area being contained in file information of a corresponding block.

16. A figure data display method according to claim 10, wherein said file information further comprises a layer number indicating a level of a hierarchical layer for efficient search and display.

17. A figure data display method according to claim 10, wherein each of said partial areas is smaller than a display area of a screen.

18. A figure data display system according to claim 17, further comprising means for calculating at least a number of a particular partial area to be displayed with said partial area of the searched number, for searching the particular partial area.

19. A figure data display method comprising the steps of:
storing figure data in a first storage device, said figure data being divided into a plurality of partial areas respectively corresponding to a sequence of serial numbers;
registering figure area data respectively corresponding to said plurality of partial areas in a second storage device in a sequence corresponding to the sequence of the serial numbers and the positions of the partial areas;
searching through said second storage device in order to determine whether figure area data corresponding to a figure data display request exists in said second storage device;
calculating figure data display area coordinates in response to a result of the searching through the second storage device;
updating the values of the serial numbers in accordance with the calculated display area coordinates; and
reading out figure data to be displayed from addresses in said first storage device corresponding to the updated serial numbers.

20. A figure data display method according to claim 19, further comprising the steps of:
transmitting the read out figure data to a display device;
displaying the read out figure data on the display device as first figure display data;
updating the display device so that the display displays updated figure data as second figure display data in place of the first figure display data, said second figure display data comprising portions of the first figure display data and portions of figure data not previously displayed;
wherein the step of updating the display device includes the steps of:
transmitting only the figure data not previously displayed from said first storage means to the display device; and
deleting from the display device the portions of the first figure display data not included within the second figure display data.

21. A figure data display system comprising:
first means for storing figure data, said figure data being divided into a plurality of partial areas respectively corresponding to a sequence of serial numbers;
second storage means for registering figure area data respectively corresponding to said partial areas in a sequence corresponding to the sequence of the serial numbers and the positions of the partial areas;
means for searching through said second storage means in order to determine whether figure area data corresponding to a figure data display request exists in said second storage means;
means for calculating figure data display area coordinates in response to a result of the searching of the second storage means;
means for updating the values of the serial numbers in accordance with the calculated display area coordinates; and
means for reading out figure data to be displayed from addresses in said first storage means corresponding to the updated serial numbers.

22. A figure data display system according to claim 21, further comprising:
means for transmitting the read out figure data to a display device;
means for displaying the read out figure data on the display device as first figure display data;
means for updating the display device so that the display device displays updated figured at a as second figure display data, said second figure display data comprising portions of the first figure display data and portions of figure data not previously displayed;
said updating means comprising:
means for transmitting only the figure data not previously displayed from said first storage means to the display device during updating of the display device; and
means for deleting from the display device the portions of the first figure display data not included within the second figure display data during updating of the display device.

* * * * *